United States Patent [19]
Hailey, Sr. et al.

[11] Patent Number: 5,502,496
[45] Date of Patent: Mar. 26, 1996

[54] APPARATUS FOR PROVIDING AUDIBLE INSTRUCTIONS OR STATUS INFORMATION FOR USE IN A DIGITAL TELEVISION SYSTEM

[75] Inventors: James E. Hailey, Sr.; David E. Virag, both of Indianapolis, Ind.

[73] Assignee: Thomson Consumer Electronics, Inc., Indianapolis, Ind.

[21] Appl. No.: 257,320

[22] Filed: Jun. 9, 1994

[51] Int. Cl.⁶ .................................................. H04N 7/12
[52] U.S. Cl. .......................................... 348/462; 348/553
[58] Field of Search ................................. 348/462, 423, 348/553, 725, 738, 484; H04N 2/12

[56] References Cited

U.S. PATENT DOCUMENTS

| | | | |
|---|---|---|---|
| 4,589,109 | 5/1986 | Chambers | 348/462 X |
| 4,907,082 | 3/1990 | Richards | 348/738 X |
| 5,036,394 | 7/1991 | Morii et al. | 348/467 |
| 5,091,936 | 2/1992 | Katznelson et al. | 348/462 X |
| 5,148,272 | 9/1992 | Acampora et al. | |
| 5,195,128 | 3/1993 | Knitl | 379/67 |
| 5,289,276 | 2/1994 | Siracusa et al. | 348/469 |

OTHER PUBLICATIONS

Corporate Computer Systems, Inc., CDQ2000 Ref. Manuel, Multi-rate Digital Audio CODEC, Feb. 1992.

*Primary Examiner*—Victor R. Kostak
*Attorney, Agent, or Firm*—Joseph S. Tripoli; Peter M. Emanuel

[57] ABSTRACT

A digital television system receives transmitted television information in the form of a stream digital packets representing video and audio information in compressed form. A packet transport unit routes the digital packets to respective digital video and audio signal processing sections according to header information contained in the packets. The digital processing sections decode and decompress the respective packets to form sequences of digital words which are subsequently converted to analog form. Apparatus for providing audible messages, such as operating instructions and status information, in tone or voice form includes a memory for storing digital representations of the audible messages in the same compressed form which the transmitted audio packets have, and a controller for selectively directing the digital representations to the packet transport unit when it is desired to provide the audible messages. The digital representations of the audible messages are automatically routed by the transport unit to the digital audio signal processing section which will decode and decompress the digital representation of the audible messages in the same manner as it does the transmitted audio packets. As a result, analog versions of the audible messages will be produced.

8 Claims, 1 Drawing Sheet

5,502,496

APPARATUS FOR PROVIDING AUDIBLE INSTRUCTIONS OR STATUS INFORMATION FOR USE IN A DIGITAL TELEVISION SYSTEM

FIELD OF THE INVENTION

The invention concerns apparatus for providing audible messages, such as operating instructions and/or status information, for example in either in tone or voice form. The invention is especially well suited for use in a digital television system.

BACKGROUND OF THE INVENTION

Consumer products such automobiles, photographic cameras and personal computers have included apparatus for providing audible messages to a user. Such apparatus includes a memory for storing digital representations of the audible messages and a special purpose decoder for converting the digital representations into corresponding analog signals. The special purpose decoder and the connective structure required to route the digital representations of the audio messages to the decoder adds cost and complexity to the consumer product which may not be warranted compared to the benefit it provides. This is especially the case where the audible user information comprises voice instructions or status indications.

SUMMARY OF THE INVENTION

The present invention resides in part in the recognition that apparatus for providing audible messages, for example, in tone or voice form, may be added with little extra cost or complexity in a digital television system of the type which receives transmitted television information in the form of a stream of digital packets representing video and audio information in compressed form. In such a system, there is a packet demultiplexer, sometimes referred to as a transport unit, which directs the digital packets to respective digital signal processing sections according to header information contained in the packets. The digital processing sections decode and decompress the respective digital packets to form sequences of digital words which are subsequently converted to analog form. In such a digital television system, apparatus for providing audible messages may be added simply by providing a memory for storing digital representations of the audible messages in the same compressed form as the transmitted audio packets have, and a controller for selectively directing the digital representations to the packet transport unit when it is desired to provide the audible messages. The digital representations of the audible messages will be automatically routed by the transport unit to the digital audio signal processing section which will decode and decompress the digital representations of the audible messages in the same manner as it does the transmitted audio packets. As a result, analog versions of the audible messages will be produced. Desirably, controller may comprise a microprocessor which controls other portions of the television receiver and the memory for storing the digital representations of the audible user instructions may comprise a section of the read only memory (ROM) associated with the microprocessor.

These and other aspects of the invention will be described with respect to the accompanying Drawing.

BRIEF DESCRIPTION OF THE DRAWING

The Drawing comprises a single FIGURE which shows, in block form, a digital television system including apparatus constructed in accordance with the invention for providing audible messages.

DETAILED DESCRIPTION OF THE DRAWINGS

Figure 1:
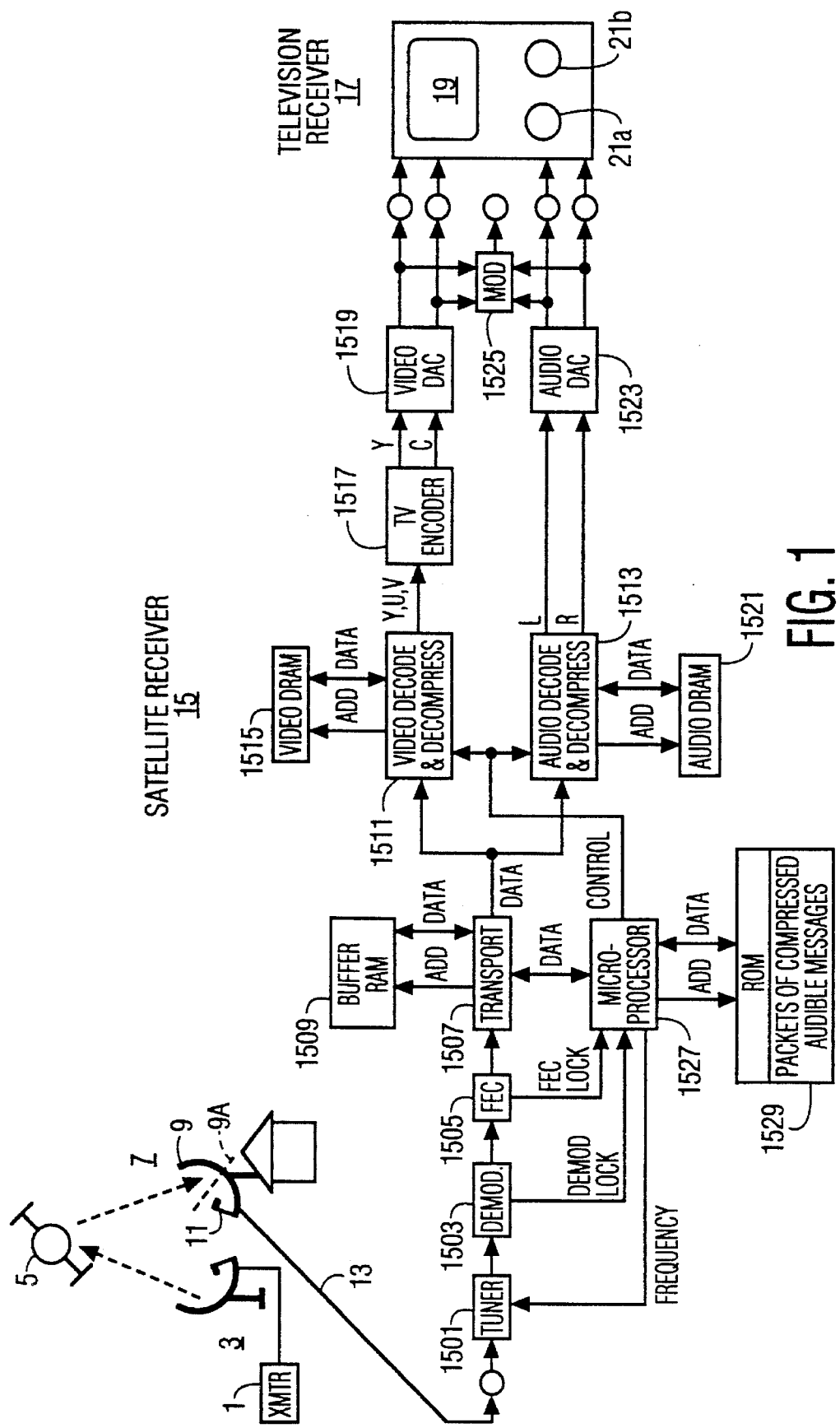

In the satellite television system shown in the single FIGURE of the Drawing, a transmitter 1, with an associated transmitting antenna 3, transmits television signals including video and audio components to a satellite 5 in geosynchronous earth orbit. Satellite 5 receives the television signals transmitted by transmitter 1 and retransmits them toward the earth. The television signals transmitted by satellite 5 are received by an antenna assembly or "outdoor unit" 7. Antenna assembly 7 includes a dish-like antenna 9 and a frequency converter 11. Antenna 9 directs the television signals transmitted from satellite 5 to frequency converter 11 which converts the frequencies of all the received television signals to respective lower frequencies. Frequency converter 11 is often called a "block converter" since it converts the frequency band of all of the received television signals as a block.

The television signals produced block converter 11 are coupled via a coaxial cable 13 to a satellite receiver 15. The satellite receiver 15 is sometimes referred to as an "indoor unit" because it is located indoors. Satellite receiver 15 tunes, demodulates and otherwise processes the received television signal as will be described in detail below to produce video and audio signals with a format (NTSC, PAL or SECAM) suitable for processing by a conventional television receiver 17 to which they are coupled. Television receiver 17 produces an image on a display screen 19 in response to the video signal and an audible response by means of speakers 21a and 21b in response to the audio signals.

The satellite television system shown in the FIGURE is a digital television satellite system in which television information is transmitted in compressed form in accordance with a predetermined digital compression standard. For example, the MPEG video and audio compression standards may be employed. The MPEG video and audio compression standards are international standards for the coded representation of and audio information developed by the Motion Pictures Expert Group.

More specifically, within transmitter 1, analog video signals and analog audio signals are converted to respective digital signals. The digital video and audio signals are compressed and encoded according to the MPEG video and audio compression and encoding standards to form respective series or streams of data packets. The video and audio packets are multiplexed to form a stream of packets for transmission. Each packet of the transmission stream includes a data or "payload" portion and a header portion which identifies the type of information represented by the data or "payload" portion of the packet. Packets corresponding to control and other data may also be added the transmission stream.

Forward error correction (FEC) data is added to the packets in order make the correction of errors due to noise within the transmission path possible. The well known Viterbi and Reed-Solomon types of forward error correction coding may both be advantageously employed. The digital information resulting from the compression, encoding and error correction operations is modulated on a carrier in what is known in the digital transmission field as QPSK (Quaternary Phase Shift Keying) modulation.

Satellite receiver 15 includes a tuner 1501 with a local oscillator and mixer (not shown) for selecting the appropriate carrier signal from the plurality of signals received from antenna assembly 7 and for converting the frequency of the selected carrier to a lower frequency to produce an intermediate frequency (IF) signal. The IF signal is demodulated by a QPSK demodulator 1503 to produce a demodulated digital signal. A FEC decoder 1505 decodes the error correction data contained in the demodulated digital signal, and based on the error correction data corrects the demodulated packets representing video, audio and other information to produce a stream of error corrected data packets. For example, FEC decoder 1505 may operate according to Viterbi and Reed-Solomon error correction algorithms when Viterbi and Reed-Solomon error correction encoding is employed in transmitter 1. Tuner 1501, QPSK demodulator 1503 and FEC decoder 1505 may be included in a unit available from Hughes Network Systems of Germantown, Maryland or from Comstream Corp., San Diego, Calif.

A transport unit 1507 cooperates with a buffer memory in the form of a random access memory (RAM) 1509 to route the payload portion of the video packets of the error corrected stream to a video decoder 1511 and the payload portion of the audio packets to an audio decoder 1513 via a data bus according to the header information contained in the packets. RAM 1509 is used to temporarily store packets of the data stream of the transmitted signal in respective memory locations in accordance with the type of information which they represent. Transport unit 1507 is a memory manager for buffer RAM 1509 which demultiplexes the data packets of the error corrected stream and routes the payload portions of the packets to respective memory locations according to the header portions of the respective packets. The contents of the video and audio sections of RAM 1509 are read out and transferred to video decoder 1511 and audio decoder 1513, respectively, on demand in response to requests from these units. Details of the construction of transport 1507 and buffer RAM 1509 are not required understand the present invention, but may be found in U.S. patent application Ser. No. 232,789, entitled "A Packet Video Signal Inverse Transport System" filed for M. S. Deiss on Apr.22, 1994.

Video decoder 1511 cooperates with a dynamic random access memory (DRAM) 1515 to decode and decompress the payload portion of the video packets to form a stream or sequence of digital words representing video information in component form. For example, the components may correspond to a luminance (Y) component and two color difference (U and V) components. Video decoding and decompression integrated circuits (ICs) are commercially available. For example, a MPEG decoding and decompression IC, identified by part number ST3240, is available from SGS Thomson, of France. The sequence of component representative digital words is coupled to a television encoder 1517 which converts the component representative digital words to a sequence of digital words representing luminance (Y) information and a sequence of digital words representing chrominance (C) information in accordance with the line and field raster scanning format of a conventional television standard such a NTSC, PAL or SECAM. The luminance and chrominance representative digital words are converted to analog luminance and chrominance signals by respective sections of a digital-to-analog converter (DAC) 1519.

Audio decoder 1513 cooperates with a dynamic random access memory (DRAM) 1521 to decode and decompress the payload portion of the audio packets to produce a sequences of digital words representing "left" (L) and "right" (R) audio information. Audio decoding and decompression ICs are commercially available. For example, a MPEG audio decoding and decompression IC, identified by part number TMS320AV110, is available from Texas Instruments, of Texas, USA. The sequences of audio representative digital words are converted to baseband analog left and right audio signals by respective sections of DAC 1523. Although only two audio channel are shown in the FIGURE, it will be appreciated that in practice, one or more additional audio channels, for example, for "surround sound" reproduction, may be provided.

The baseband analog video and audio signals are coupled to television receiver 17 via respective baseband connections. The baseband analog video and audio signals are also coupled to a modulator 1525 which modulates the analog signals on to a radio frequency (RF) carrier in accordance with a conventional television standard such as NTSC, PAL or SECAM for coupling to the antenna input of a television receiver without baseband inputs.

A microprocessor 1527 provides frequency selection control data to tuner 1501 for controlling the operation of tuner 1501 to tune channels selected by the user. Microprocessor 1527 also operates interactively with transport 1507 to affect the routing of payload portions of packets. Microprocessor 1527 additionally provides control data to video decoder 1511 and audio decoder 1513 via a control bus. Microprocessor 1527 operates in response to a control program stored in a "read only" memory (ROM) 1529.

The present system includes apparatus for providing audible messages, for example, in the form of tones or voice, which makes advantageous dual use of structure that is already there for another purpose. The apparatus for providing audible messages to be described below avoids the need for dedicated special purpose apparatus which would add to the complexity and therefore cost of satellite receiver 15.

The audible messages may be used in a number of ways. In its simplest form, a tone, series of tones or tone bursts ("beeps") may be produced to indicate proper or improper actions by a user, for example to assist in the alignment of antenna assembly 7. In a more complex form, information may be provided by voice, for example, to instruct the user as to the operation of a particular feature of satellite receiver 15 or to provide status information such as the time or channel number.

The manner in which audible tones are used to assist in the alignment of antenna assembly 7 will now be described.

Antenna assembly 7 has to be positioned to receive the television signals transmitted by satellite 5 to provide optimal image and audible responses. The positioning operation involves accurately aligning center line axis 9A of dish antenna 9 to point at satellite 5. Both an "elevation" adjustment and an "azimuth" adjustment are required for this purpose. The elevation of antenna assembly 7 is the angle of axis 9A in a vertical plane relative to the horizon. The azimuth is the angle of axis 9A in a horizontal plane relative to the direction of true north. A mounting fixture (not shown) is adjustable in both elevation and azimuth relative to a mounting pole (not shown) for the purpose or aligning antenna assembly 7.

When the antenna assembly 7 is installed, the elevation can be adjusted with sufficient accuracy by setting the elevation angle by means of a protractor portion of the mounting fixture according to the latitude of the receiving location. Once the elevation has been set, the azimuth is coarsely set by pointing antenna assembly generally in the direction of satellite 5 according to the longitude of the receiving location. A table indicating the elevation and azimuth angles for various latitudes and longitudes may be included in the owner's manual accompanying satellite receiver 15. The elevation can be aligned relatively accurately using the protractor because the mounting pole is readily set perpendicular to the horizon using a carpenter's level or plum line. However, the azimuth is more difficult to align accurately because the direction of true north cannot be readily determined.

Satellite receiver 15 includes audible antenna alignment apparatus for assisting the user to align the azimuth position of antenna assembly 7. The audible alignment apparatus is activated, for example, by the selection of an antenna alignment mode of operation from a menu caused to be displayed on screen 19 of television receiver 17. The audible alignment apparatus will cause a continuous audible tone of fixed frequency and magnitude to be generated by speakers 21a and 21b only when the azimuth position is within a limited range, for example, of five degrees, including the precise azimuth position corresponding to optimal reception. The continuous tone is no longer generated (that is, it is muted) when the azimuth position is not within the limited range. The audible alignment apparatus will also cause a tone burst or beep to be produced each time satellite receiver 15 completes a tuner search algorithm without finding a tuning frequency for a selected channel at which correction of errors in the digitally encoded information of the received signal is possible. The search algorithm is need because, although the carrier frequency for each channel is known, block converter 11 has a tendency to introduce a frequency error, for example, in the order of several MHz.

Once the antenna alignment operation is initiated, tuner 1501 is controlled by microprocessor 1527 to search for the local oscillator frequency appropriate for tuning a particular channel. During the search algorithm, tuning is attempted at a number of frequencies surrounding the nominal frequency for the selected channel. Proper tuning is indicated when a "demodulator lock" signal is produced by demodulator 1503. If tuning is proper, the error condition of the digitally encoded information contained in the received signal is examined by examining an error representative "FEC lock" signal produced by FEC unit 1505. If either proper tuning or error correction is not possible at a particular search frequency, the tuning and error correction conditions are examined at the next search frequency. This process continues until all of the search frequencies have been evaluated. At that point, if either proper tuning or error correction was not possible at any of the search frequencies, a tone burst or beep is produced to indicate to a user that antenna assembly 7 is not yet with the limited azimuth range needed for proper reception. On the other hand, if both proper tuning is achieved and error correction is possible at any of the search frequencies, the alignment apparatus causes a continuous tone to be produced to indicate to a user that the antenna assembly 7 is within the limited azimuth range needed for proper reception.

The user is instructed in the owner's manual accompanying satellite receiver 15 to rotate antenna assembly 7 around the mounting pole by a small increment, for example, three degrees, when a beep occurs. Desirably, the user is instructed to rotate antenna assembly 7 once every other beep. This allows the completion of the tuning algorithm before antenna assembly 7 is moved again. (By way of example, a complete cycle of the tuning algorithm in which all search frequencies are searched may take three to five seconds.) The user is instructed to repetitively rotate antenna assembly 7 in the small (three degree) increment (once every other beep) until a continuous tone is produced.

The user is instructed that once a continuous tone has been produced, to continue to rotate antenna assembly 7 until the continuous tone is again no longer produced (that is, until the tone is muted) and then to mark the respective antenna azimuth position as a first boundary position. The user is instructed to thereafter reverse the direction of rotation and to rotate antenna assembly 7 in the new direction past the first boundary. This causes the continuous tone to be generated again. The user is instructed to continue to rotate antenna assembly 7 until the continuous tone is again muted and to mark the respective antenna position as a second boundary position. The user is instructed that once the two boundary positions have been determined, to set the azimuth angle for optimal or near optimal reception by rotating antenna assembly 7 until it midway between the two boundary positions. The centering procedure has been found to provide very satisfactory reception. The antenna alignment mode of operation is then terminated, for example, by making a menu selection.

The manner in which the continuous tone and tone bursts (beeps) are generated will now be described.

ROM 1529 stores digital data encoded to represent an audible tone at a particular memory location. The tone data is stored in the same compressed form, for example, according to the MPEG audio standard, as the as a payload or data portions of the transmitted audio packets. The tone data is stored as a data packet without header information. To produce the continuous audible tone, microprocessor 1527 causes the tone data to be read from the tone data memory location of ROM 1529 and to be transferred to the audio data memory location of buffer RAM 1509 associated with transport 1507. The audio memory location of transport RAM 1509 in which the tone data is stored is the same memory location in which the data portions of transmitted audio packets are stored. During this process, microprocessor 1527 causes the transmitted audio data portions of the transmitted packets to be discarded by not directing them to the audio memory location of RAM 1509.

The tone data stored in RAM 1509 is transferred via the data bus to audio decoder 1513 in the same manner as the data portions of the transmitted audio packets. The tone data is decompressed by audio decoder 1513 in the same manner as the data portions of the transmitted audio packets. The resultant decompressed digital audio signal is converted to analog signals by DAC 1523. The analog signals are coupled to speakers 21a and 21b which produce the continuous audible tone.

To generate a tone burst or beep, microprocessor 1527 causes the tone data to be transferred to audio decoder 1513 in the same manner as described above, but causes the audio response to be muted except for a short time by causing a muting control signal to be coupled to audio decoder 1513 via the control bus.

The above described process for generating the audible tone and tone bursts can be initiated at the beginning of the antenna alignment operation. In that case, microprocessor 1527 generates a continuous muting control signal until either the generation of the continuous tone or tone burst is required.

The tone burst and continuous tone may alternatively be generated in the following way. To produce the tone burst, microprocessor 1527 causes the tone data to read from the tone data memory location of ROM 1529 and to be transferred to audio decoder 1513 via transport 1507 in the manner described above. To generate a continuous tone, microprocessor 1527 cyclically causes the tone data to read from the tone data memory location of ROM 1529 and to be transferred to audio decoder 1513. In essence, this produces an almost continuous series of closely spaced the tone bursts.

A user voice message is produced in the same manner as the tone and tone bursts. Data representing the voice message is stored in ROM 1529 in the same compressed form, for example, in accordance with the MPEG audio compression format, as the data portions of the transmitted audio packets. Under the control of microprocessor 1527, the storage of the data portions of newly transmitted audio packets in the audio section of buffer RAM 1509 is interrupted, the current contents of the audio section of RAM 1509 are discarded, and the compressed voice data is read from ROM 1529 and transferred to the audio section of RAM 1509. Thereafter, the voice data is transferred via transport 1507 and the data bus to audio decoder 1513 where it is decompressed. The resulting sequence of digital words is converted to analog form by DAC 1523. After the voice message has been completed, the normal processing of transmitted audio packets is reinitiated.

The voice data is stored in ROM 1529 in data packets (packets without headers). If the voice message is short, all of the packets of voice data can be transferred from ROM 1529 to the audio section of RAM 1509 at one time. For longer voice messages, the packets of voice data are transferred in segments.

It is desirable that the voice message data be in monophonic (rather than stereophonic form) to reduce the amount of data which has to be stored in ROM 1509. According to the MPEG standard, 256 Kbits (32 Kbytes of 8 bit bytes) per second provide CD (compact disk) stereophonic quality sound. For monophonic voice information less than 4 Kbytes per second is required to provide one-half to one second of voice information.

Voice messages can be used in a variety of circumstances to provide instructions or status information. For example, the voice messages may be used to facilitate the alignment of antenna assembly 7. The voice message may be use to instruct the user to "move" or "stop moving" antenna assembly dependent on the condition of a signal strength representative signal generated by tuner 1501 or demodulator 1503. The user voice messages can also be used to indicate user caused system operating errors ("Please try again."), operating instructions ("Select channel.") or system status ("Waiting for input.").

While the present invention has been described in terms of a specific embodiment, it will be appreciated that modifications may be made. For example, while the invention has been described with respect to a satellite television system, it may be employed in other types of systems which receive audio information in compressed form. In addition, while the invention has been described with respect to a system which receives audio information which is compressed and encoded according to the MPEG audio standard, it is also applicable to systems which receive audio information compressed and encoded according to other standards, such as NICAM, Dolby™ AC-3 or MUSICAM. NICAM is an audio compression and encoding standard used for terrestrial television transmission in Europe. The Dolby™AC-3 compression standard is proposed for terrestial high definintion television (HDTV) in the United States. MUSICAM is a MPEG-based compression standard and is described together with a commercially available CDQ2000 encoder/decoder in the "CDQ2000 Reference Manual" Published in 1992 by Corporate Computer Systems, Inc., New Jersey, USA. Further, structural aspects of the embodiment may be modified in to suit a particular circumstance. For example, audio DRAM 1521 may be omitted, depending on the data rate, or incorporated in audio decoder and decompression unit 1513. These and other modifications are contemplated to be within the scope of the invention defined by the following claims.

I claim:

1. In a television system for processing received digital signals representing video and audio information which has been compressed for transmission, said digital signals being organized in a stream of multiplexed packets, each of said packets including payload data representing a particular type of information, header data for identifying the particular type of information represented by the payload data and error correction data, apparatus comprising:

means responsive to said received stream of digital signals for correcting errors occurring in said packets according to the respective error correction data to produce an error corrected stream of multiplexed data packets;

a buffer memory including a memory location for storing payload data representing transmitted video information and a memory location for storing payload data representing transmitted audio information;

a transport responsive to said error corrected stream of packets for routing payload data of said packets to ones of said memory locations of said memory section according to the respective header data contained in said packets;

a decoder for decompressing payload data representing video information to produce a digital signal representing decompressed video information;

means for coupling a signal responsive to said digital signal representing said decompressed video information to an image reproducing device;

a decoder for decompressing payload data representing audio information to produce a digital signal representing decompressed audio information;

means for coupling a signal responsive to said digital signal representing said decompressed audio information to a sound reproducing device;

a data bus for coupling payload data stored in said memory locations of said buffer memory to respective decoders;

a control memory for storing data representing audible message information which has been compressed in the same manner as the transmitted audio information; and a controller for selectively routing said audible message data from said control memory to said memory location of said buffer memory for temporarily storing said payload data representing transmitted audio information so that said audible message data is thereafter routed to said audio decoder.

2. The apparatus recited in claim 1, wherein:

said means for coupling said signal responsive to said digital signal representing said decompressed video information to said image reproducing device includes a digital-to-analog converter for converting said digital signal representing said decompressed video information to an analog video signal; and said means for coupling said signal responsive to said digital signal representing said decompressed audio information to said sound reproducing device includes a digital-to-analog converter for converting said digital signal representing said decompressed audio information to an analog audio signal.

3. The apparatus recited in claim 1, wherein: said audible message data corresponds to a voice message.

4. The apparatus recited in claim 1, wherein: said audible message data corresponds to a tone message.

5. The apparatus recited in claim 4, wherein: said tone message is a continuous tone.

6. The apparatus recited in claim 4, wherein: said tone message is an intermittent tone.

7. The apparatus recited in claim 1, wherein:

said control memory stores data representing tone information which has been compressed in the same manner as the transmitted audio information; and said controller selectively routes said tone data from said control memory to said memory location of said buffer memory for temporarily storing said payload data representing transmitted audio information so that said tone message data is thereafter routed to said audio decoder.

8. The apparatus recited in claim 7, wherein:

said controller periodically generates a signal for causing said means for coupling a signal responsive to said digital signal representing said decompressed audio information to a sound reproducing device to periodically interrupt said signal responsive to said digital signal representing said decompressed audio information after said controller has routed said tone data from said control memory to said memory location of said buffer memory for temporarily storing said payload data representing transmitted audio information.

* * * * *